(12) United States Patent
Meyer

(10) Patent No.: US 9,676,457 B2
(45) Date of Patent: Jun. 13, 2017

(54) SURFBOARD WITH REMOVABLE WHEELS

(71) Applicant: Yancey A. Meyer, Encinitas, CA (US)

(72) Inventor: Yancey A. Meyer, Encinitas, CA (US)

(*) Notice: Subject to any disclaimer, the term of this patent is extended or adjusted under 35 U.S.C. 154(b) by 0 days.

(21) Appl. No.: 13/913,347

(22) Filed: Jun. 7, 2013

(65) Prior Publication Data

US 2013/0328280 A1 Dec. 12, 2013

Related U.S. Application Data

(60) Provisional application No. 61/656,912, filed on Jun. 7, 2012.

(51) Int. Cl.
| | | |
|---|---|---|
| *B63B 35/79* | (2006.01) | |
| *A63C 17/01* | (2006.01) | |
| *B60F 3/00* | (2006.01) | |

(52) U.S. Cl.
CPC .......... *B63B 35/795* (2013.01); *A63C 17/012* (2013.01); *A63C 17/014* (2013.01); *A63C 17/015* (2013.01); *B60F 3/0069* (2013.01); *A63C 2203/06* (2013.01); *B63B 35/79* (2013.01)

(58) Field of Classification Search
CPC ................ A63C 17/01–17/015; A63C 17/017
See application file for complete search history.

(56) References Cited

U.S. PATENT DOCUMENTS

| | | | | |
|---|---|---|---|---|
| 5,267,743 | A * | 12/1993 | Smisek ................... | 280/87.042 |
| 5,823,551 | A * | 10/1998 | Conroy ................... | 280/47.131 |
| 5,984,328 | A * | 11/1999 | Tipton ..................... | 280/87.042 |
| 7,296,816 | B2 * | 11/2007 | Wilnau .................... | 280/414.2 |
| 8,079,604 | B2 * | 12/2011 | Newton ................... | 280/11.27 |
| 8,469,569 | B1 * | 6/2013 | Tunnicliffe et al. ..... | 362/545 |
| 8,500,146 | B2 * | 8/2013 | Genov et al. ........... | 280/87.042 |
| 2003/0173384 | A1 * | 9/2003 | Clark et al. ............. | 224/314 |
| 2005/0247819 | A1 * | 11/2005 | Caruso .................... | 244/2 |
| 2009/0256325 | A1 * | 10/2009 | Dickie .................... | 280/87.042 |
| 2011/0037238 | A1 * | 2/2011 | Devine et al. .......... | 280/87.042 |
| 2011/0133440 | A1 * | 6/2011 | Christ ..................... | 280/809 |
| 2013/0026728 | A1 * | 1/2013 | Genov et al. ........... | 280/87.042 |
| 2013/0328280 | A1 * | 12/2013 | Meyer .................... | 280/87.042 |

* cited by examiner

*Primary Examiner* — Erez Gurari
(74) *Attorney, Agent, or Firm* — Donn K. Harms

(57) ABSTRACT

A wheeled system for engagement with a surfboard is provided. Wheeled mounting plates removably engageable with a bottom surface of a surfboard, allow a rider to ride on support surfaces such as the sidewalk, and to remove the wheeled mounting plates to employ the surfboard in the water. The wheeled mounting plates may be retrofitted to existing boards with an elastic or mechanical engagement, or provided in combination with a surfboard.

14 Claims, 3 Drawing Sheets

SURFBOARD WITH REMOVABLE WHEELS

BACKGROUND OF THE INVENTION

1. Field of the Invention

The present invention relates to surfboards. More particularly the invention relates to a surfboard device employing removably engageable wheels such that the board can function both as a skateboard with wheels engaged and a surfboard when the wheels are disengaged.

2. Prior Art

The art of surfing waves is an exceptionally fast growing sport and hobby for individuals who live near the beach. Modern surfboards are conventionally hand shaped out of polyurethane foam cores and covered in one or more layers of fibreglass cloth and polyester resin. Other methods and materials of surfboard construction include employing expanded polystyrene (EPS) foam cores or extruded polystyrene closed cell cores, and epoxy resins. Modern technology allows many epoxy boards to be either hand shaped or molded to any desired dimension. Other manufacturing methods are also known.

For all board types, the surfboard is completed by the addition of one or a plurality of fins, which is conventionally engaged at the tail end of the board on the bottom surface. The fin acts as a type of rudder and allows the rider to maneuver the board over the surface of the water while providing stability and control. It is known that different fin shapes and configurations will provide a user with a different ride. As a result, many modern surfboards employ removably engageable fins which allows the user to interchange the fin as needed for a particular wave or riding style.

Conventional removable engagement of fins is accomplished by employment of a fin mount, also referred to as a fin box or plug, engaged within the surface of the board and employs means for securement of the fin, such as a set screw or the like. An example of commonly known removable fin system is FCS (Fin Control System). This system employs fin securement plugs which are permanently engaged to the surfboard during the application of fiberglass and resin. The fins include projecting members which are configured to engage within the plugs, and set screws are employed to secure them therein. This system is widely considered as the most convenient and easy to use system available in the market today. Other removable engagement systems known in the art include FUTURE FINS, RAINBOW FIN COMPANY, and others.

Skateboarding is another well known sport which is similar to surfing in that the rider is propelled over a surface atop a board. Skateboards comprise wooden boards, also referred to as decks, with wheel assemblies called trucks, engaged to the bottom of the deck for attaching the wheels and deck. The trucks are conventionally composed of two parts; a top part which is screwed to the deck and is called the baseplate; and the hanger engaged beneath the baseplate. The axle runs through the hanger and engages the wheels. Rubber bushings are engaged between the baseplate and the hanger which provide the cushion mechanism for turning the skateboard. Skateboard trucks are often manufactured in a number of different axle widths.

Skateboarding evolved after surfing and was often a downtime activity for surfers when the waves and conditions were less than desirable. As a result, skateboarding as often been considered an attempt to mimic the feel and flow of surfing on water. Prior art has shown many attempts at providing skateboards that mimic the feel of riding on water. However, for many advanced, as well as novice, surfers nothing compares to the actual feel of riding a surfboard on a wave. As such, the appeal of skateboards which mimic surfing is considerably low.

However, many surfers continue to employ skateboards for both recreation as well as modes of transportation, especially to and from the beach. Skateboard riding is an environmentally friendly alternative to driving as is therefor desired amongst the surfing community. However, there exists many downfalls of employing skateboards as a means to get a user to the beach to surf.

As one could easily ascertain, the initial purchase and upkeep of both a skateboard and surfboard can be quit expensive. Further, surfers will often hide their skateboards when at the beach in order to reduce the chance of their skateboard being stolen while they are surfing, as a skateboard left in plain sight is an easy target to thieves. It seems that many of these problems can be solved by combining the ground transportation of a skateboard with the wave riding abilities of a surfboard.

As such, there is a continuing unmet need for a surfboard device employing removably engaged wheels which would provide users with a means for transportation to a surfing location as well as a functioning rideable surfboard, when the wheels are removed. Such a device should advantageously be configurable with conventional removable engagement systems known in the art.

Further, such a device should include reinforcement means, such as nose, tail, or rail guards, to protect the surfboard during the ground transports so as the board can be maintained as a water tight, functioning surfboard when the wheels are removed.

The forgoing examples of related art and limitation related therewith are intended to be illustrative and not exclusive, and they do not imply any limitations on the invention described and claimed herein. Various limitations of the related art will become apparent to those skilled in the art upon a reading and understanding of the specification below and the accompanying drawings.

SUMMARY OF THE INVENTION

The device herein disclosed and described provides a solution to the shortcomings in prior art and achieves the above noted goals through the provision of surfboard device employing removably engageable wheels. The device is comprised of a functioning surfboard component and removably engageable wheel assembly. The removable wheel assembly is preferably of a conventional skateboard truck configuration however comprising a baseplate portion which is configured for removable engagement to complimentary mounts disposed on a surfboard. The mounts are preferably conventionally known fin mounts, such as plugs, boxes, or other suitable means known in the art.

In accordance with one preferred mode, the surfboard component is reinforced to accommodate the forces conventionally associated with turning and maneuvering a skateboard. There is also preferably included removably engageable protection means which can be employed to protect the nose, tail, and rails of the surfboard component. The surfboard component may be formed by any conventional surfboard manufacturing technique known in the art. The removably engageable protection will be pads or protection on the side rails, nose, and tail, which easily remove and engage.

With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention.

As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements.

It is an object of this invention, to provide an engagement system for wheel supports to a surfboard for land riding, which are removable when employing the board in the water, as a complete unit or retrofit kit.

Additional objects of the invention will be brought out in the following part of the specification, wherein detailed description is for the purpose of fully disclosing the invention without placing limitations thereon.

BRIEF DESCRIPTION OF DRAWING FIGURES

The accompanying drawings, which are incorporated herein and form a part of the specification, illustrate some, but not the only or exclusive, examples of embodiments and/or features. It is intended that the embodiments and figures disclosed herein are to be considered illustrative rather than limiting. In the drawings.

DETAILED DESCRIPTION OF THE PREFERRED EMBODIMENTS OF THE INVENTION

Figure 1:
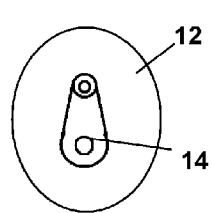
FIG. 1 shows a top view of a preferred mode of the baseplate component comprising part of the removably engageable wheel assembly.

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation.

Figure 2:
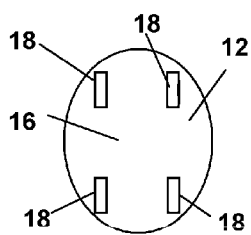
FIG. 2 shows a bottom view of the baseplate component.
Figure 3:
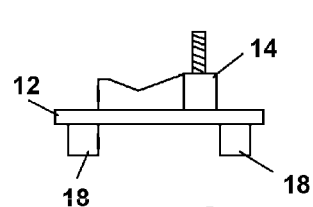
FIG. 3 is a side view of the baseplate component.

Now referring to drawings in FIGS. 1-13, wherein similar components are identified by like reference numerals, there is seen in FIG. 1, FIG. 2, and FIG. 3 views of the preferred baseplate component 12 comprising part of the removable engageable wheel assembly 11.

The baseplate 12 can be formed from conventional materials such as metal or plastic, and includes conventional truck hanger 20 engagement means 14, such as a bolt or 'kingpin'. In another mode, conventional trucks 17 may be engaged with bolts or other means to the lower surface of a baseplate 16, or the projecting kingpin 14, at a proper angle, as shown in FIGS. 9-10 and 12-13.

Figure 6:
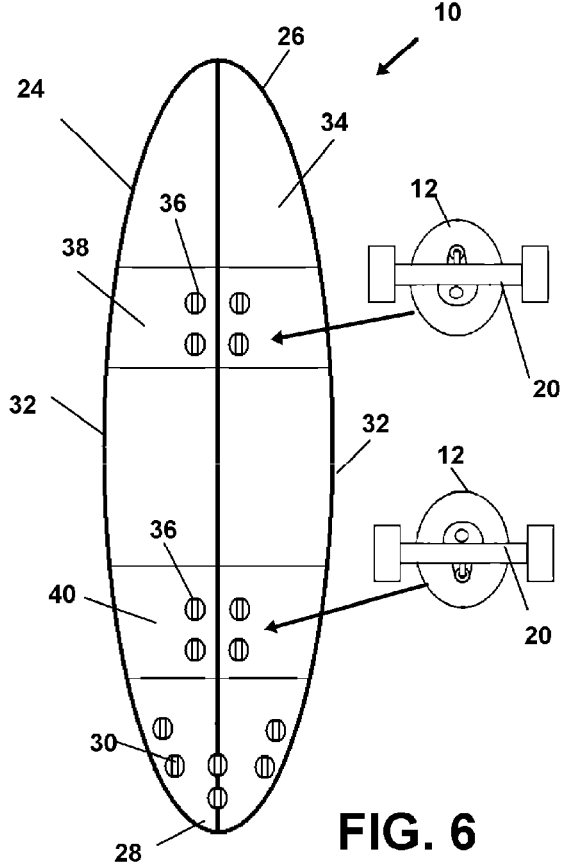
FIG. 6 shows the device with the preferred surfboard component configured with mounting means, such as plugs, for removable engagement with the wheel assembly.

The engagement surface 16 of the baseplate 16, includes a plurality of engagement members 18 projecting therefrom. The engagement members 18 are preferably configured for engagement to conventional recessed mounting means such as fin plugs 36 (FIG. 6). Fin plug systems are well known and the device 10 herein will function well with removably engageable projecting members 18 which are configured for removable cooperative engagement in a fin box or recessed mount, such as for instance the system of U.S. Pat. No. 5,934,963, which is made part hereof.

However it is within the scope of the invention to employ other means for removable engagement of the baseplate 12 to a surfboard 24 such as straps 37 shown herein, or other means as would occur to those skilled in the art and such are anticipated within the scope of this disclosure.

Figure 4:
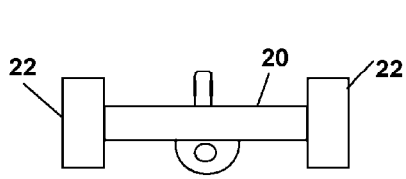
FIG. 4 shows a top view of a preferred hanger component comprising part of the wheel assembly.
Figure 5:
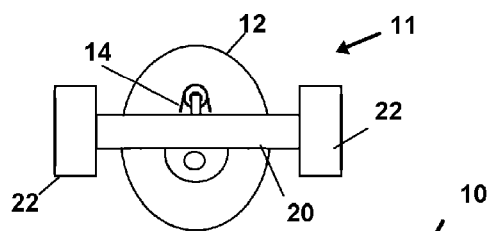
FIG. 5 shows an assembled view of the wheel assembly.

FIG. 4 and FIG. 5 show views of a hanger component 20 which is engageable to the baseplate 12 by conventional means (i.e. kingpin and nut, bushings, and additional hardware). In FIG. 5 is shown the assembled removably engageable wheel assembly 11. FIG. 6 shows a view of the preferred surfboard component 24 of the device 10. The surfboard component 24 is comprised of a nose 26, tail 28, conventional fin engagement plugs 30, and left and right side rails 32. The surfboard component 24 is preferably configured to be functionally employable as a surfboard when the wheel assembly 11 is disengaged and conventional fins (not shown) are engaged within fin plugs 30.

The surfboard 24 may be formed any suitable manufacturing method known in the art. Further, as can be seen in the figure the bottom surface 34 of the surfboard 24 include a plurality of additional plug components 36 configured to removably engage the engagement members 18 of the baseplate 12 of the wheel assembly 11. A current preferred material for the board 24 if the device is sold in a complete component set would be epoxy, however other materials known may be employed so long as the means for engagement of the base plates 16 providing the mounts for the wheels 22 is strong enough to maintain the base plates 16 in the as used position during riding.

Figure 7:
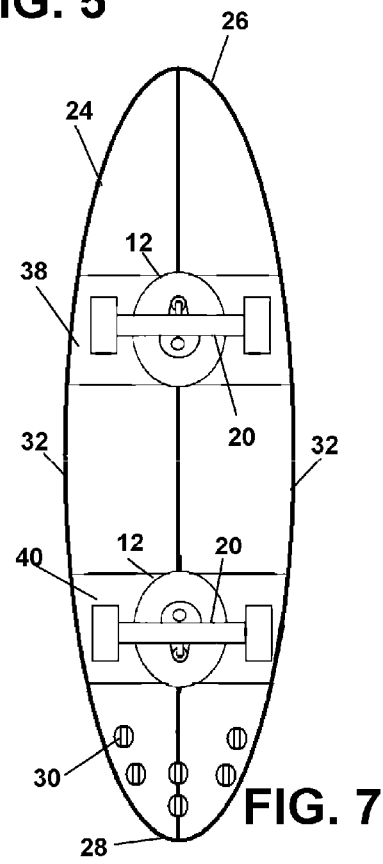
FIG. 7 shows a view of the device with the wheel assembly engaged to the surfboard component.

Briefly, the plug components 36 may be plugs conventionally known in the art, such as those provided by FCS brand, which include cavities configured to receive and secure the engagement members 18 projection from the baseplate 12. Securement is provided by set screws (not shown) or other securement means suitable for the intended purpose, such snap locks or the like. The surfboard 24 may additionally include reinforced portions 38, 40 disposed at or near the location of the engagement plugs 36. Reinforcement can be provided by forming the board 24 with additional layers of material, such as wood or fiberglass, and will allow the device 10 to withstand the forces associated with turning and maneuvering the device 10 with the wheel assembly 11 in the engaged position (FIG. 7). The device 10 may additionally include removably engageable nose 26, tail 28, and side rail 32 protectors which will provide additional protection to the specified areas. A rubber or padding material may be employed between the bottom surface 34 and baseplate 12 to further protect the board 24.

Figure 8:
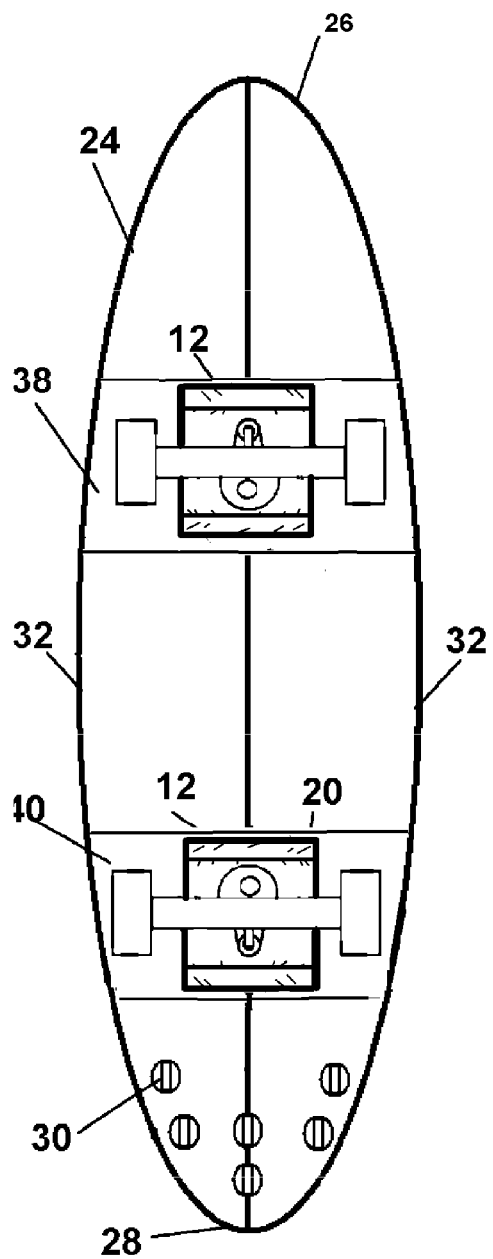
FIG. 8 shows the device having base plates which separate the board from the truck and angle the truck at an incline relative to the end of the surfboard on which it engages.
Figure 9:
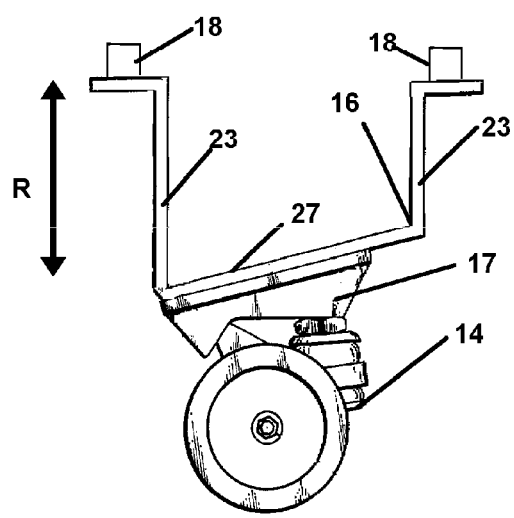
FIG. 9 depicts a side view of the baseplate having elevational sections between the engagement surface and the truck engagement member.

As shown in FIG. 8 the device 10 has two especially preferred components which may be employed in all modes of the device 10. The base plate 16 have a base member 21 positioned to mate with the bottom surface of the board 24 and support it when the base plates 16 are in the as-used position as in FIGS. 7-8. However, experimentation has found that boards 24 can come in sizes which have widths which can contact the ground during hard turns of the board 24. Additionally, some riders tend to turn especially hard, such that even when riding narrower boards 24, they tend to scrape. Consequently the base plates 16 formed with base members 21 having a pair of elevational members 23 extending between the base member 21 and the truck engagement member 27 have proven to work well to alleviate this problem. The elevational members 23 length which provides a separation distance also shown as a rise "R" in FIG. 9. This separation distance depicted by "R" in FIG. 9, is of a distance anywhere from 2-8 inches from the bottom of the truck to the bottom surface of the board 24. This elevational addition provided by the separation distance shown as "R" of FIG. 9, provides a means to substantially prevent contact of the board 24 with the ground during hard turns and the like, and from contacting the wheels 22.

Because the distancing of the wheels 22 from each other on the hanger component 20 providing the axle, is generally preferred larger than that of a skateboard due to the larger size of the surfboard, the board can tend to be hard to turn. However it has been found that by angling the truck engagement member 27 between the first and second elevational members 23, that the board 24 with the device 10 in the as-used position, will turn easier. Thus an angle on the engagement member 27 upward relative toward the end of the board 24 it is mounted is desirable and angling the truck engagement member between 25-60 degrees is a preferred range. A 45-60 degree angle is especially preferred, however, the distance between the wheels 22 on their hanger 20 will effect this calculation. By imparting this angle to the truck engagement member 27 the king pin 14 will extend perpendicular thereto and this provides easier turning and more comfortable straight rides.

Figure 10:
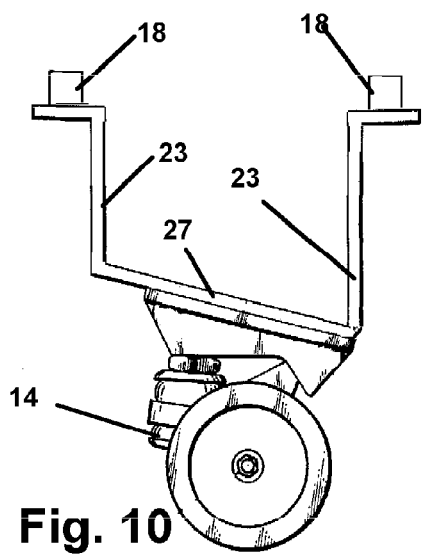
FIG. 10 depicts a similar baseplate to that of FIG. 9 with an angled truck engagement member configured for the opposite side of the board.

FIG. 9 depicts a side view of the baseplate 16 having elevational members 23 supporting the truck engagement member 27 at an angle as noted with the kingpin 14 extending therefrom. FIG. 10 as noted shows a similar baseplate 16 configuration to that of FIG. 9 with an angled truck engagement member 27 at a rising angle toward the opposite side of the board 24 from that of FIG. 9.

Figures 11, 12, 13:
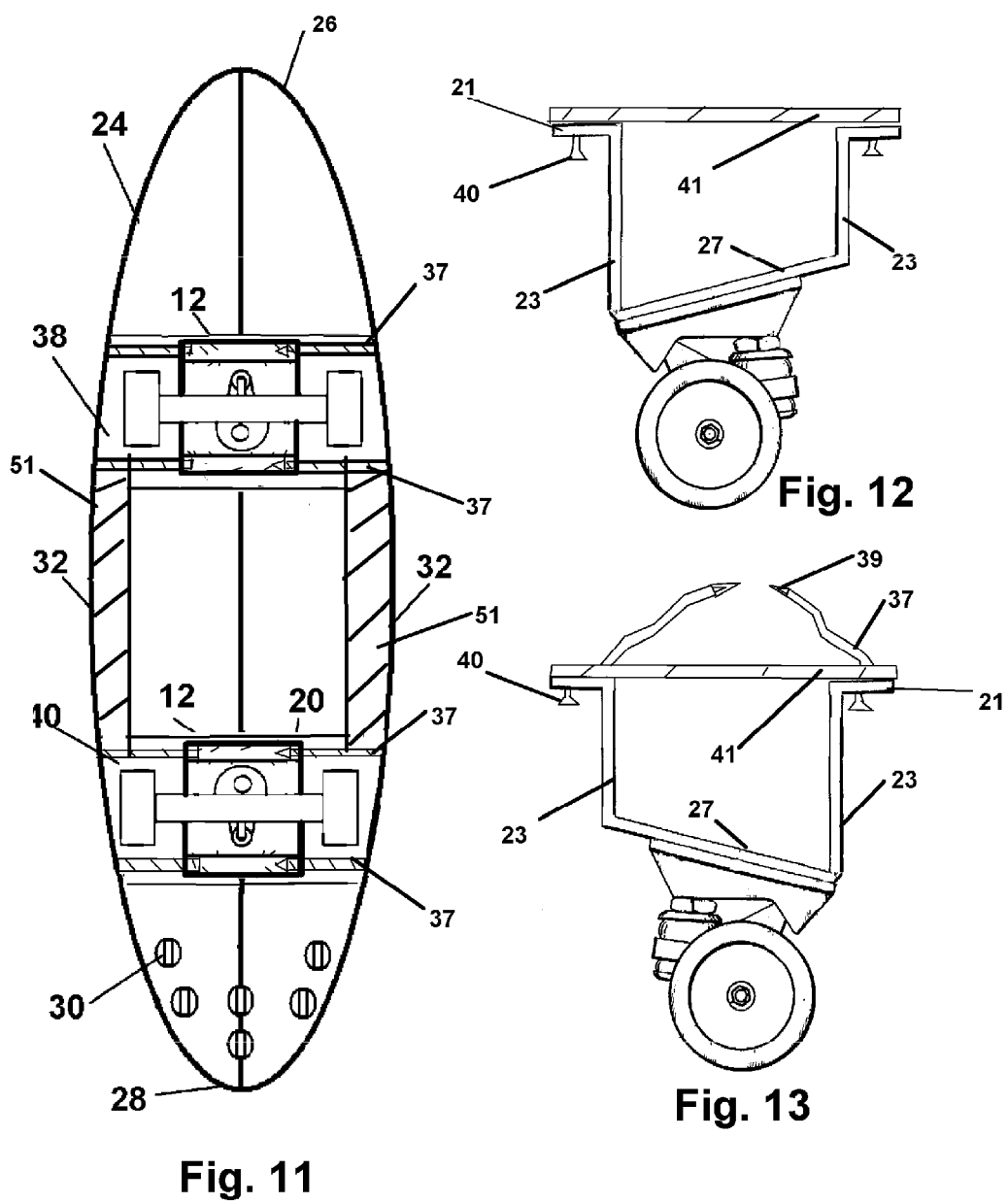
FIG. 11 depicts a mode of the device wherein straps having an elastic quality are employed to position the base plates in operative engagement in an as-used position similar to the as-used positions of FIGS. 7-8.
FIG. 12 depicts the baseplate for the board of FIG. 11 having a friction enhancing pad and mounts for the distal end of straps of FIG. 13.
FIG. 13 shows the opposite mounting plate from FIG. 12 for the board of FIG. 11, and depicts the elastic straps which when stretched impart and encircling biased engagement of the board to hold the base plates in place.

FIG. 11 depicts a mode of the device 10 wherein straps 37 formed of an elastic material such as rubber rope, are employed to position the base member 21 of the base plates 16 in operative engagement with the bottom of the board 24, in an as-used position, similar to the as-used positions of FIGS. 7-8. The straps 37 may be employed by themselves to hold the base plates 16 in the as-used position, or in conjunction with a means for maintaining the position of the baseplate 16 on the board 24 such as the engagement members 18 with fit within the cooperatively engaging recesses into the board 24 such as the engagement plugs 36, shown in FIG. 6. Alternatively, a compressible member 41 such as a neoprene or rubber or polymeric pad, can be positioned between the baseplate 16 and board 24 as shown in FIG. 13 and the straps 37 which are engaged at a first end to the base plate 16 may be encircled around the top and sides of the board 24 and fastened to the base member 16 using cooperative fasteners 39 and 41 engaged to the strap 37 and the baseplate 16.

The configurations for this biased encircle engagement by the strap 37 may employ the base plates 16 of FIG. 12 and FIG. 13. As shown, the baseplate 16 for the board 24 supporting the wheels 22 in a rolling engagement, have a friction enhancing compressible member 41 for a sandwiched engagement between the base plate 16 and the bottom of the board 24. With friction enhancing surface such as suction cups or ridges on the side of the compressible member 41 facing the board 24, slippage can me minimized or eliminated when the elastic straps 37 are stretched and thereby encircle and grip the sides and top of the board in a compressibly biased engagement. This biased engagement holds the straps 37 against the top of the board 24 and the base plate 16 firmly in place against the bottom of the board 24 preferably with the compressible member 41 sandwiched therein. Of course as noted, projecting members such as the engagement members 18 may also be employed to project into mating sockets in the board 24 and through the compressible member 41 if present. This yields an especially sturdy mount and takes the pressure off of the recesses in the board 24 and the engagement members 18 if used alone.

In a minimal mode, for retrofitting boards 24, the device may be provided with the two base plates 16 and means to engage such to a board which in the simplest mode would be the elastic strap 37 engagement. The angled truck engagement member 27 may be at the preferred angles noted, or may be perpendicular if desired by a user.

From this minimal mode, the device is preferably provided as a matched set of assembleable components including a board 24 which is configured with appropriate recessed plugs 36 in positions to register in engagement with engagement members 18 projecting from the base plates 16. The base plates 16 will be configured with an angle between 45 and 60 degrees to properly position the kingpin 14 to project for the turning to match the turning radius to the rider and the board width and the wheel 22 separation.

Means for removable engagement of the base plates 16 to the as-used position on the board 24 may be the registered plug 36 recesses positioned to removably attach to engagement members 18. Or, the elastic straps 37 may be employed with or without the engagement members 18 and plugs 36. The elastic straps 37 may also be employed to hold pads 51 against the side rails of the board 24. The pads 51 may also be formed to engage in a compressed fit of the nose or tail within a pad 51 recess so that pads 51 may be engaged around the entire perimeter of the board 24 or in positions desired.

This invention has other applications, potentially, and one skilled in the art could discover these. The explication of the features of this invention does not limit the claims of this application; other applications developed by those skilled in the art will be included in this invention.

It is additionally noted and anticipated that although the device is shown in its most simple form, various components and aspects of the device may be differently shaped or slightly modified when forming the invention herein. As such those skilled in the art will appreciate the descriptions and depictions set forth in this disclosure or merely meant to portray examples of preferred modes within the overall scope and intent of the invention, and are not to be considered limiting in any manner.

While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:

1. A wheeled apparatus for a surfboard, comprising:
   a pair of mounting plates;
   each of said mounting plates adapted on a first side, for a removable engagement with a first surface of a surfboard, said first surface being opposite a riding surface of said surfboard;
   a first of said mounting plates positionable to a said removable engagement, at a cental position of said first surface between two sides of said surfboard, and closer to a nose end of said surfboard than said second of said mounting plates;
   a second of said mounting plates positionable to a said removable engagement, at a said cental position of said first surface between two sides of said surfboard, and closer to a tail end of said surfboard than said first of said mounting plates;
   a pair of elastic straps, each engaged at a respective first end, to a respective one of said mounting plates;
   a second end of each said elastic straps, having a first fastener thereon, said first fastener cooperatively engageable with a respective mating fastener positioned on each respective said mounting plate;
   said mounting plates engageable to respective said removable engagements, by a stretched encirclement of a said strap over said riding surface of said surfboard, said stretched encirclement extending from said respective engagement of each said first end of said strap to each respective said mounting plate, to an engagement of each respective first fastener to a respective mating fastener;
   said stretched encirclement providing a compressibly biased encirclement of each respective said strap against said riding surface and each respective said mounting plate against said first surface, whereby said stretched encirclement maintains said mounting plates in said removable engagement; and
   wheels operatively engaged with an axle, extending from an engagement with a second side, opposite from said first side, of both said first mounting plate and said second mounting plate, whereby a rider positioned on said riding surface with said pair of mounting plates each positioned to a said removable engagement, can ride on said surfboard during a rolling of said wheels on a support surface, and with said mounting plates removed from said removable engagement, said rider can ride said surfboard on a liquid surface while positioned on said riding surface.

2. The wheeled apparatus of claim 1, wherein said removable engagement with a first surface of a surfboard comprises:
   projections extending from said first side of each respective said mounting plate, said projections positioned to align in a registered engagement with mating recesses communicating into said first surface of said surfboard.

3. The wheeled apparatus of claim 1 additionally comprising:
   said straps maintaining pads against said two sides of said surfboard.

4. The wheeled apparatus of claim 1 wherein said engagement of said axle extending from said second side, comprises:
   a king pin of a skate board truck, engaged with said second side of said mounting plate, and extending away from said second side;
   said axle operatively engaged with each said king pin.

5. The wheeled apparatus of claim 2 wherein said engagement of said axle extending from said second side, comprises:
   a king pin of a skate board truck, engaged with said second side of said mounting plate, and extending away from said second side;
   said axle operatively engaged with each said king pin.

6. The wheeled apparatus of claim 3 wherein said engagement of said axle extending from said second side, comprises:
   a king pin of a skate board truck, engaged with said second side of said mounting plate, and extending away from said second side;
   said axle operatively engaged with each said king pin.

7. The wheeled apparatus of claim 1 additionally comprising:
   said second side being spaced from said first side a separation distance, said separation distance being between 2-6 inches; and
   said separation distance providing means for maintaining said surfboard separated from a contact with said support surface during a turning of said board by said rider.

8. The wheeled apparatus of claim 2 additionally comprising:

said second side being spaced from said first side a separation distance, said separation distance being between 2-6 inches; and said separation distance providing means for maintaining said surfboard separated from a contact with said support surface during a turning of said board by said rider.

9. The wheeled apparatus of claim 3 additionally comprising:

said second side being spaced from said first side a separation distance, said separation distance being between 2-6 inches; and said separation distance providing means for maintaining said surfboard separated from a contact with said support surface during a turning of said board by said rider.

10. The wheeled apparatus of claim 4 additionally comprising:

said second side being spaced from said first side a separation distance, said separation distance being between 2-6 inches; and said separation distance providing means for maintaining said surfboard separated from a contact with said support surface during a turning of said board by said rider.

11. The wheeled apparatus of claim 5 additionally comprising:

said second side being spaced from said first side a separation distance, said separation distance being between 2-6 inches; and said separation distance providing means for maintaining said surfboard separated from a contact with said support surface during a turning of said board by said rider.

12. The wheeled apparatus of claim 6 additionally comprising:

said second side being spaced from said first side a separation distance, said separation distance being between 2-6 inches; and said separation distance providing means for maintaining said surfboard separated from a contact with said support surface during a turning of said board by said rider.

13. The wheeled apparatus of claim 12 additionally comprising:

said second side of said mounting plates being spaced from said first side thereof, in an uneven separation distance;

said uneven separation distance defining an angle of respective said second sides, relative to said first side;

said angle of said second side of said first mounting plate, being downward from and end furthest from said nose, toward said support surface; and said angle of said second side of said second mounting plate, being downward from and end furthest from said tail, toward said support surface.

14. The wheeled apparatus of claim 13 additionally comprising:

a surfboard engaged with said mounting plates.

* * * * *